US010956747B2

(12) United States Patent
Barzelay et al.

(10) Patent No.: US 10,956,747 B2
(45) Date of Patent: Mar. 23, 2021

(54) CREATING SPARSELY LABELED VIDEO ANNOTATIONS

(71) Applicant: International Business Machines Corporation, Armonk, NY (US)

(72) Inventors: Udi Barzelay, Haifa (IL); Yevgeny Yaroker, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 16/236,712

(22) Filed: Dec. 31, 2018

(65) Prior Publication Data

US 2020/0210706 A1    Jul. 2, 2020

(51) Int. Cl.
  *G06F 3/0484*    (2013.01)
  *G06K 9/00*     (2006.01)
(52) U.S. Cl.
  CPC ....... *G06K 9/00718* (2013.01); *G06F 3/0484* (2013.01)
(58) Field of Classification Search
  None
  See application file for complete search history.

(56) References Cited

U.S. PATENT DOCUMENTS 9,118,886 B2   8/2015  Wang et al.
9,984,315 B2   5/2018  Gaidon et al.
2018/0211396 A1*  7/2018  Roshtkhari Javan ... G06T 7/277
2019/0114804 A1*  4/2019  Sundaresan ............. G06K 9/66
2020/0135235 A1*  4/2020  Pena .................. H04N 5/23232
2020/0143193 A1*  5/2020  Najibikohnehshahri ...................
                                        G06K 9/00664
2020/0211333 A1*  7/2020  Bailey ................ G06F 1/1601

OTHER PUBLICATIONS

Jorge Niño-Castañeda et al., Scalable Semi-Automatic Annotation for Multi-Camera Person Tracking, IEEE Transactions on Image Processing, vol. 25, No. 5, May 2016, pp. 2259-2274.
Priyam Bakliwal et al., Collaborative Contributions for Better Annotations, 12th International Joint Conference on Computer Vision, Imaging and Computer Graphics Theory and Applications, (VISAPP, VISIGRAPP-2017), Feb. 2017, 9 Pages.
GitHub—Microsoft/VoTT: Visual Object Tagging Tool:An electron app for building end to end Object Detection Models from Images and Videos, pp. 1-12, downloaded Nov. 18, 2018, from https://github.com/Microsoft/VoTT.

(Continued)

*Primary Examiner* — Idowu O Osifade
(74) *Attorney, Agent, or Firm* — Daniel P. Morris; Otterstedt, Wallace & Kammer, LLP (57) ABSTRACT

Methods and systems for annotating an object in a video frame. An annotation of an object in a video frame is obtained and a plurality of computerized object trackers are run on the annotated object to automatically label the annotated object in a plurality of subsequent video frames. A computerized user interface aggregating results of the automatic labeling by the plurality of computerized object trackers is presented and, based on the computerized user interface, an identification of a best one of the plurality of computerized object trackers is obtained. The selected computerized object tracker is used to annotate the object in the plurality of subsequent video frames.

20 Claims, 7 Drawing Sheets

(56) References Cited

OTHER PUBLICATIONS

Peter Mell and Timothy Grance, The NIST Definition of Cloud Computing, NIST Special Publication 800-145, Sep. 2011, cover, pp. i-iii, pp. 1-3.

Vatic—Video Annotation Tool—UC Irvine, pp. 1-3, downloaded Nov. 18, 2018 from http://www.cs.columbia.edu/~vondrick/vatic/.

Adam A, Rivlin E, Shimshoni I. Robust fragments-based tracking using the integral histogram. InComputer vision and pattern recognition, 2006 IEEE Computer Society Conference on Jun. 17, 2006 (vol. 1, pp. 798-805). IEEE.

Figure Eight Announces Datasets, Video Object Tracking, and Smart Bounding Box Annotation to Accelerate the Adoption of AI, downloaded Nov. 18, 2018 from https://www.prnewswire.com/news-releases/figure-eight-announces-data . . . , pp. 1-5.

* cited by examiner

CREATING SPARSELY LABELED VIDEO ANNOTATIONS

BACKGROUND

The present invention relates to the electrical, electronic and computer arts, and more specifically, to video annotation.

Video labeling techniques are useful for a number of applications. In order to evaluate an annotation algorithm, such as an object recognition algorithm that tracks objects in a video stream, a dataset (ground truth) containing video files is used to assess the performance and accuracy of the annotation algorithm. A number of video frames of the video contain annotations (associated with square locations in the video image) along with a corresponding label. For example, a dataset may contain videos annotated with the locations of cats, text, logos, and the like in each frame of the video.

Annotating a video can be a tedious task since a video includes many consecutive frames. For example, a three-minute video with a frame rate of 30 frames per second contains 5,400 (3*60*30) images that are to be labeled; annotating each one of these images separately may be time consuming. There are a variety of tools for annotating images, both open source and commercial, but many are ineffective at reducing the effort and/or time required for an individual to annotate a video.

SUMMARY

Principles of the invention provide techniques for sparse labeled video annotation. In one aspect, an exemplary method includes the operations of obtaining an annotation of an object in a video frame; running a plurality of computerized object trackers on the annotated object to automatically label the annotated object in a plurality of subsequent video frames; presenting a computerized user interface aggregating results of the automatic labeling by the plurality of computerized object trackers; obtaining, based on the computerized user interface, an identification of a best one of the plurality of computerized object trackers; and using the selected computerized object tracker to annotate the object in the plurality of subsequent video frames.

In one aspect, an exemplary non-transitory computer readable medium comprises computer executable instructions which when executed by a computer cause the computer to perform operations comprising: obtaining an annotation of an object in a video frame; running a plurality of computerized object trackers on the annotated object to automatically label the annotated object in a plurality of subsequent video frames; presenting a computerized user interface aggregating results of the automatic labeling by the plurality of computerized object trackers; obtaining, based on the computerized user interface, an identification of a best one of the plurality of computerized object trackers; and using the selected computerized object tracker to annotate the object in the plurality of subsequent video frames.

In one aspect, an exemplary apparatus comprises a memory; and at least one processor, coupled to the memory, and operative to perform operations comprising: obtaining an annotation of an object in a video frame; running a plurality of computerized object trackers on the annotated object to automatically label the annotated object in a plurality of subsequent video frames; presenting a computerized user interface aggregating results of the automatic labeling by the plurality of computerized object trackers; obtaining, based on the computerized user interface, an identification of a best one of the plurality of computerized object trackers; and using the selected computerized object tracker to annotate the object in the plurality of subsequent video frames.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

semi-automatically annotating an object in a video;

reducing the amount of effort and/or time for a user to annotate a video; and providing a comparison of annotations performed using different object trackers.

These and other features and advantages of the present invention will become apparent from the following detailed description of illustrative embodiments thereof, which is to be read in connection with the accompanying drawings.

DETAILED DESCRIPTION

Generally, systems and methods for annotating a video are disclosed. In one example embodiment, an object in a video frame is manually annotated and the object is automatically annotated in subsequent video frames.

The manual labeling of a video is a very time-consuming task since, for each frame, there are a lot of very similar additional frames. Usually, the difference between consecutive frames is very small and insignificant; nevertheless, in current techniques, the user often manually annotates all of the frames. There is a known technique used in a variety of video annotating tools such a VATIC, which uses object tracking (a computer vision algorithm detecting the same objects in consecutive frames) to automatically label consecutive (very similar) frames. That is to say, the user annotates only the first frame in the sequence and then the object tracking algorithm annotates the rest. A problem in this type of approach is that there is no one tracking algorithm that performs best on all types of content and/or objects. One or more embodiments advantageously use several tracking algorithms simultaneously and then show the user a very convenient user interface (UI) presenting the results of automated annotation by the trackers. Using this UI, a user can easily see which of the "proposals" is the best. The user then will pick the best result, which will be applied to video annotation.

One or more embodiments are implemented in software running on one or more virtualized and/or non-virtualized hardware processors. Advantageously, the convenient UI presented to the user allows him or her to choose the most accurate annotation from options provided by different trackers.

One or more embodiments advantageously improve the technological process of video annotation by providing a user with a novel computer-generated user interface.

Thus, in one or more embodiments, a comparison of the results generated by different object trackers is presented to a user and the user is assisted in the selection of one of the tracking results. In one example embodiment, the selection of the object tracker is performed automatically by the system (although the user may verify the choice in one or more embodiments). For example, the system can propose the best option by algorithms like majority votes or reverse tracking (to check if tracking goes to the initial point). The methods described herein may reduce the amount of effort and/or time for an individual to annotate a video, such as annotating a text object in a video stream. The amount of effort may be measured, for example, by a count of mouse or keyboard clicks. In one or more embodiments, annotations are created to measure performance of the automatically annotating algorithms and are used as ground truth; a human verifies, for each annotation, that it is correct. One or more embodiments advantageously enable making this process semi-automatic since it takes significantly less time to approve right suggestions made by the system than to manually draw the annotations for each frame It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
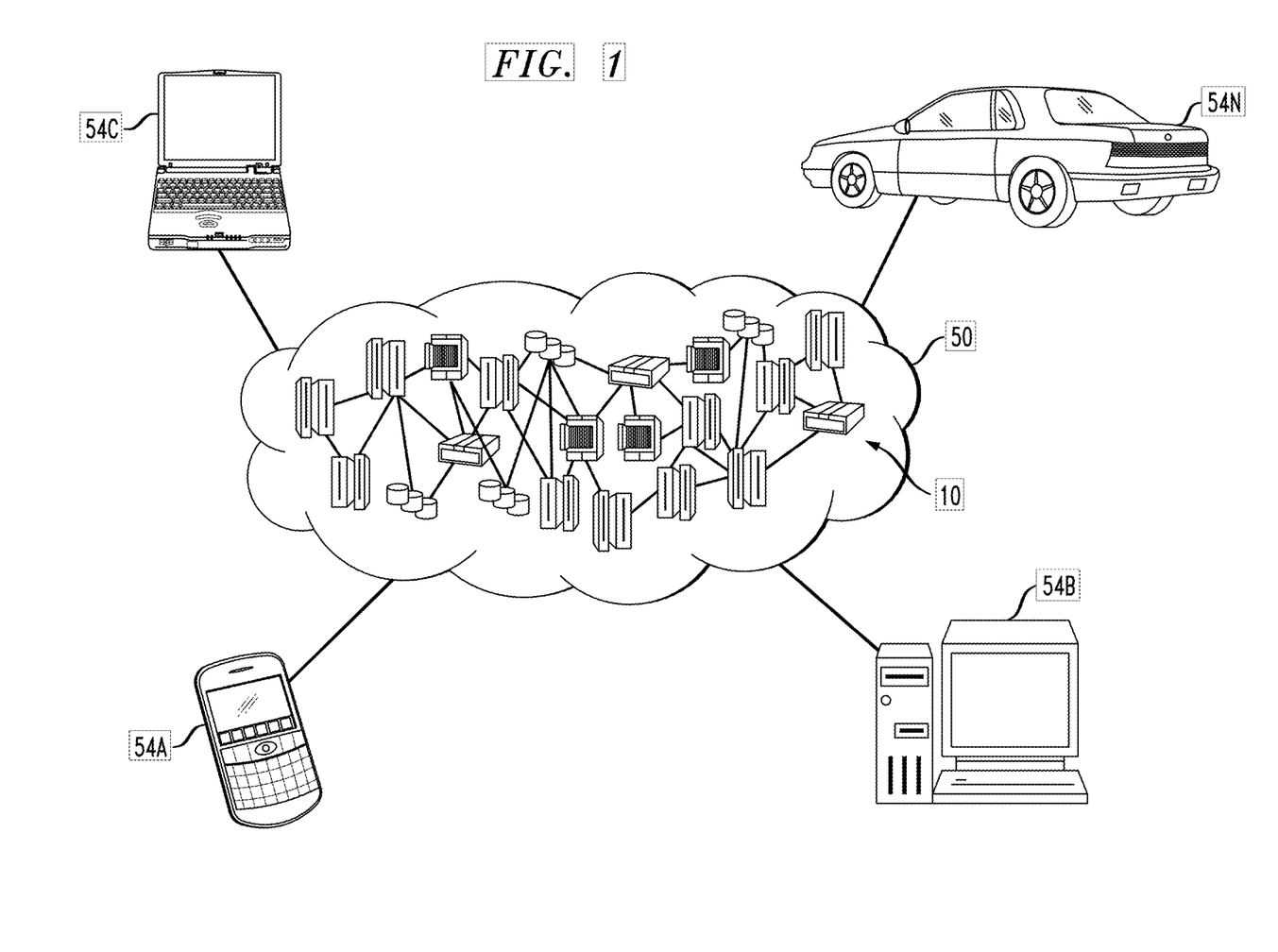
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
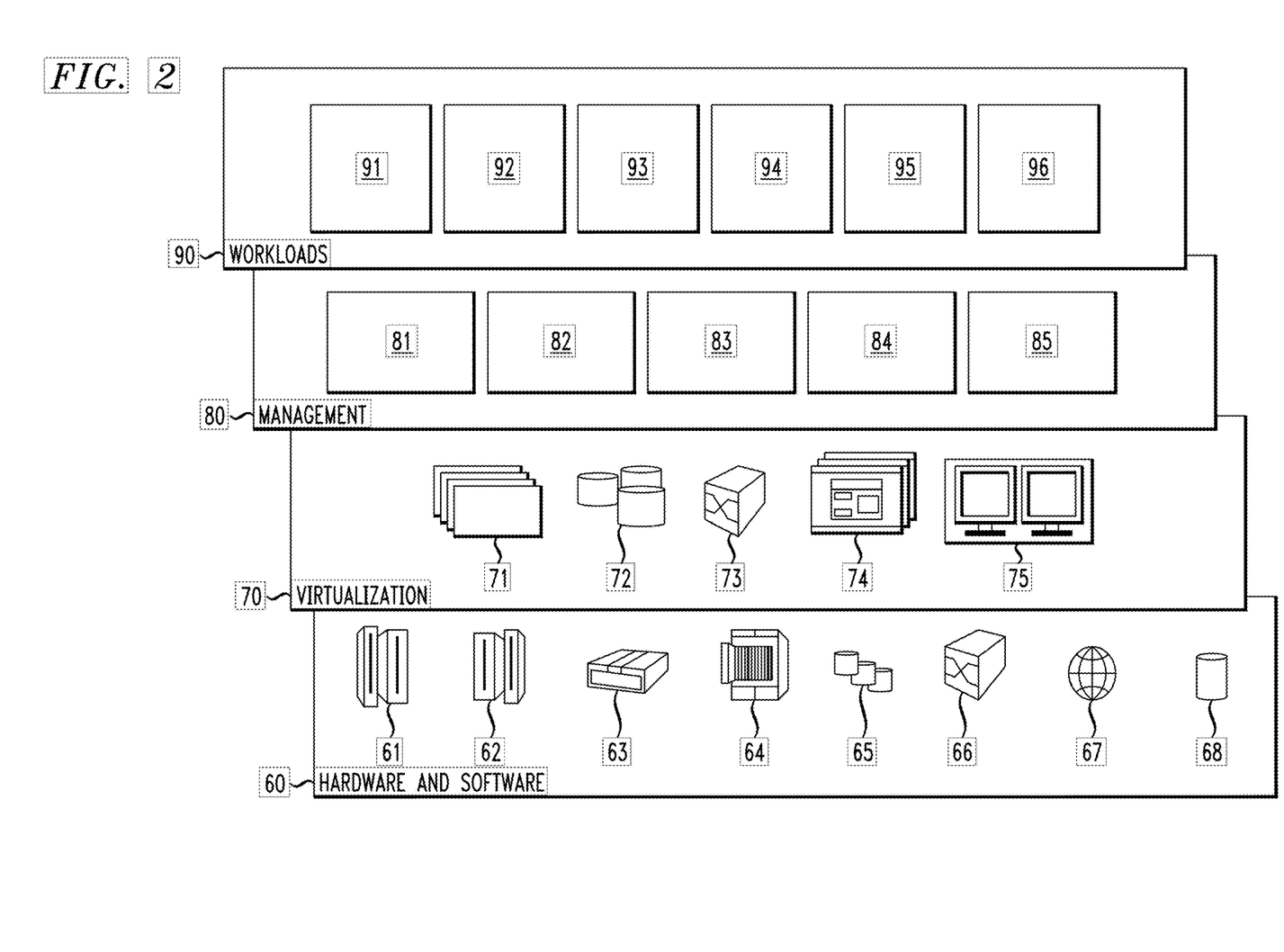
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video annotator 96.

In one example embodiment, an object within a video frame is annotated, and the annotation is persisted across other frames of the video using, for example, various object tracking methods. A user interface (UI) presents the results of annotating the video using a plurality of object trackers simultaneously with, for example, an indication of how many frames were tracked by each of the object trackers. The user interface gives a user a qualitative and quantitative view of the tracking results and enables the user to select a particular object tracker for the present annotations. For example, a best performing object tracker, an object tracker that identifies the greatest count of occurrences of the object, and the like, can be selected. As noted above, in one example embodiment, the object tracker is automatically selected by the system (although the user may verify the choice in one or more embodiments).

The video annotation may be performed using a variety of techniques. Suppose, for example, that a specific text string S first appears in video frame X, appears in the next N video frames until a final appearance in video frame Y, where the text string S appears in all frames between frame X and frame Y. Naively, the text string S could be manually labeled in the N+1 consecutive video frames by an individual. Such an approach can be time consuming for the user. Thus, other example methods may be used to annotate the video.

In a first example method, the occurrence of an object, such as the string S, in selected video frames X and Y is marked and interpolation is used to annotate other video frames. This is proposed by a free, online, interactive video annotation tool called VATIC, but may result in post annotation corrections and adjustments (which may be time consuming). In a second example method, the occurrence of the object in a frame X is marked and object tracking is used to identify the object in other video frames and to annotate other occurrences of the object. Current tools usually provide a single tracker type and then a user manually fixes the tracked locations, if needed. In a third example method, annotation labels are copied from one frame and to the next frame. An object tracker is used to determine the last appearance of the object and thereby determine when to stop the copying process. The added annotations are used, for example, as ground truth to evaluate performance of algorithms (creating annotations automatically; for instance, automatically recognizing text in the video). In one or more embodiments, added annotations are used as ground truth to evaluate "labeling" algorithms. For instance, it is desired to evaluate an algorithm for automatically detecting text in a video (the text and its location). So it can be evaluated by comparing its results to the "ground truth" (manually labeled/annotated video). Using the same technique, the algorithm can be evaluated by automatically detecting commercial logos (e.g. "acorn") in the video and other "labeling" algorithms.

In one example embodiment, the user marks the occurrence of an object in an arbitrary video frame and continues annotating additional objects in the same or different segments of the video. In the background, the system predicts or otherwise identifies the locations of one or more objects in other frames of the video. For example, the system may predict the locations of the string S in consecutive frames of a video, or using backward and forward tracking. The system may utilize different methods, such as different object trackers, as part of the background task. In one example embodiment, the object is tracked from frame X onwards using several different object trackers concurrently.

Many different tracking methods (e.g., Crypto-Stego-Real-Time (CSRT), kernelized correlation filters (KCF), Fragtrack (Amit Adam, Ehud Rivlin and Ilan Shimshoni, Robust Fragments-based Tracking using the Integral Histogram (pdf). *IEEE Conference on Computer Vision and Pattern Recognition (CVPR)*, June 2006), Matrox imaging library (MIL) (from Matrox Imaging, Montreal, Canada), and the like) are used or the same tracker is used using a higher learning rate.

Once all methods are performed, the user is presented with a UI that displays the results of each method and allows the user to select one of the methods. In one example embodiment, the best performing method may be selected, such as the one whose last prediction best matches with the location that the user marked in frame Y (or the location that provides the highest overlap (e.g., highest intersection over union) with the user's labeled location). In one example embodiment, the user is assisted by the UI to select the method.

Figure 3:
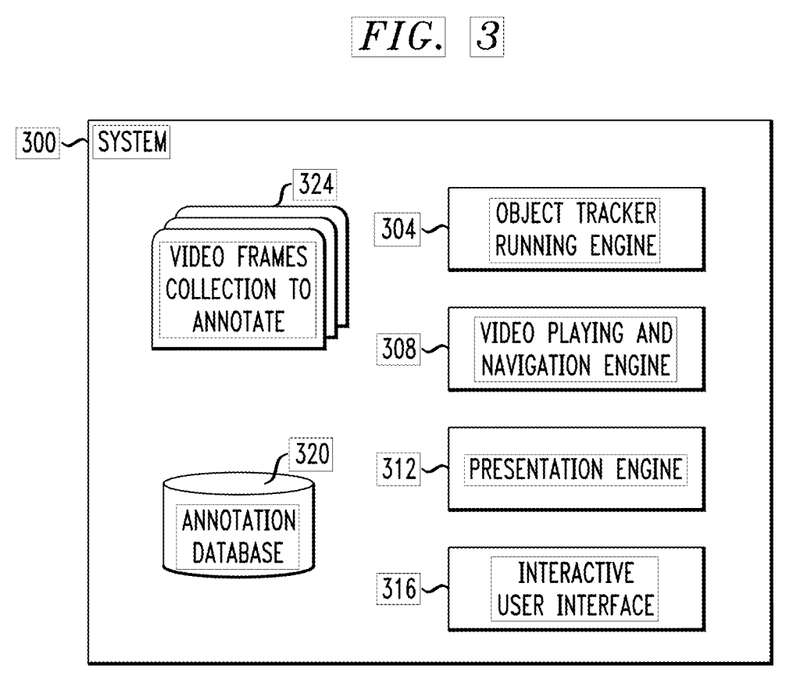
FIG. 3 is a block diagram of an example system for annotating a video, in accordance with an example embodiment.

FIG. 3 is a block diagram of an example system 300 for annotating a video, in accordance with an example embodiment. The system 300 includes an object tracker running engine 304, a video playing and navigation engine 308, a presentation engine 312, an interactive user interface 316, and an annotation database 320. The object tracker running engine 304 runs a variety of different object trackers to identify a selected object in one or more video frames, such as video frames in a video frames collection 324. In one example embodiment, the object trackers are run based on an annotation manually added by a user via the interactive user interface 316. The annotation results are stored, for example, in a temporary data structure. In one example embodiment, the video playing and navigation engine 308 enables a user to navigate the video frame-by-frame such that annotations may be added to (edited), or removed from, an object in the video.

In one or more embodiments, a user initially annotates an object in a frame of a video. For example, the user may attach a label to a particular object identified in a video frame. In a non-limiting example, an initial object in a video frame is annotated manually by a user, and this annotation is obtained by the system 300. The system 300 then helps the user to annotate consecutive frames in a video. The presentation engine 312 aggregates the results of the various annotation methods for presentation by, for example, the interactive user interface engine 316. The aggregated information includes, for example, the annotated video frames from the different trackers, an indication of how many frames were tracked by each of the object trackers, and the like.

The interactive user interface engine 316 enables a user to manually add, remove, and edit annotations. For example, a user may use a mouse to select an object in a video frame and to add an annotation to the object. The interactive user interface engine 316 also generates a user interface for viewing the results of a variety of annotation methods and for selecting a particular annotation method, as described more fully below by way of example in conjunction with FIGS. 4A, 4B, and 4C. The annotation database 320 maintains the generated annotations, such as annotations generated by the system 300 with the assistance of a user.

Figure 4:
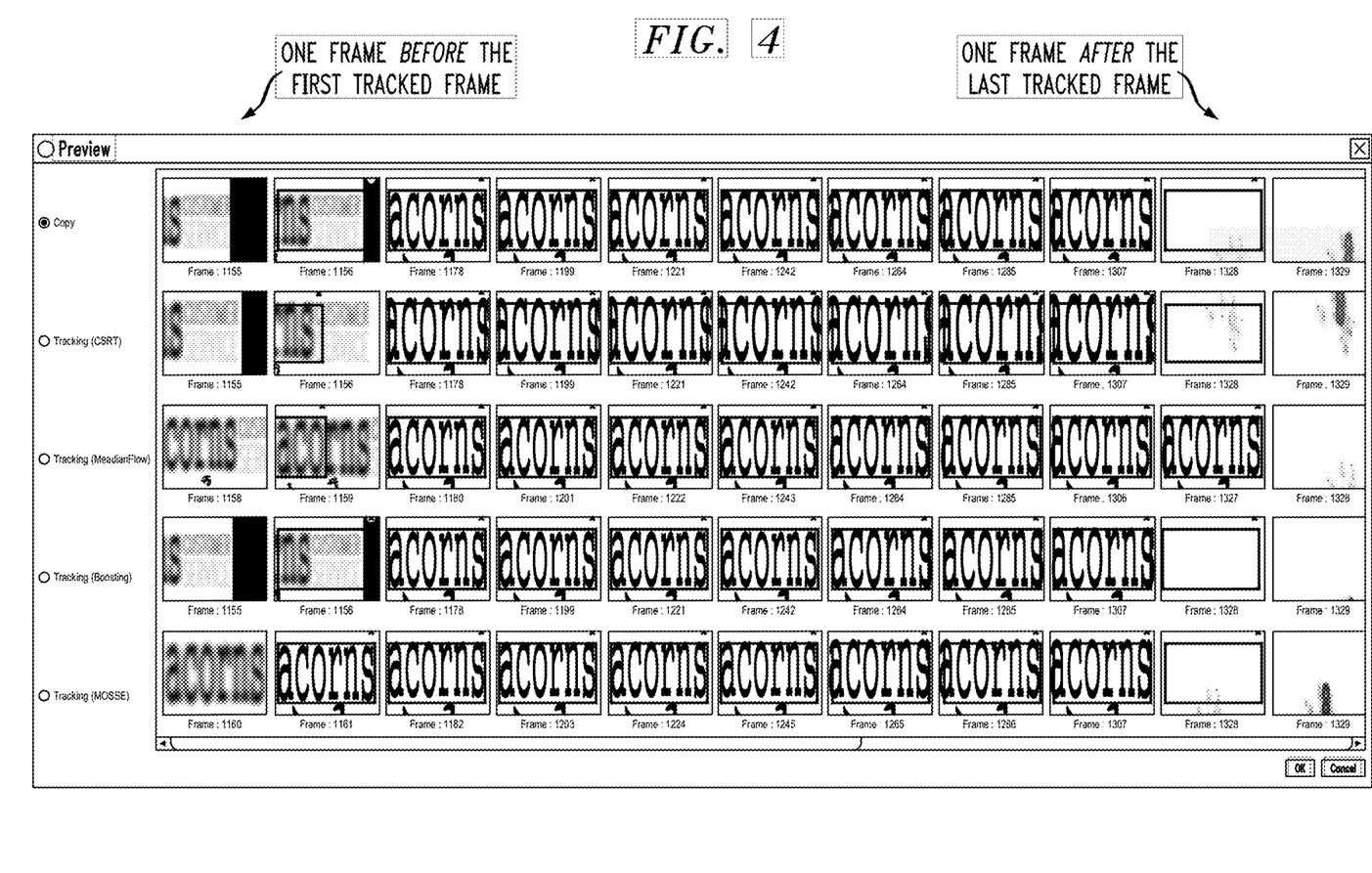
FIG. 4 provides an illustration of an example user interface (UI) for viewing the results of annotating a video, in accordance with an example embodiment.

FIG. 4 is an illustration of an example user interface (UI) 400 for viewing the results of annotating a video, in accordance with an example embodiment. The user is presented with several visualizations and selects the sequence having the best results. In the UI 400, each row shows the tracking results of a different object tracker over a series of frames. One frame before the first tracked frame and one frame after the last tracked frame are displayed to provide an indication to a user of whether tracking was started and stopped at the right position in the video. The first before and after frames should not contain the chosen word "acorn" for the "good" trackers and do contain this word for "bad" trackers.

In one example embodiment, for each method (e.g., object tracking method), a number of frames between frame X and Y (for example, 10 frames along the timeline between X and Y) are uniformly sampled and the location of the predicted locations of the object (along with a portion of the frame that provides context and removes ambiguity as to which part of the frame the annotation belongs) are cropped out. The system can show as well the points (frames) of disagreement between the trackers in order to provide the user more valuable information. This visualization offers an easy way for a user to evaluate the performance of each specific method. After the selection of the particular method, all the locations of the object between frames X and Y will be annotated with additional labels.

Figure 5A:
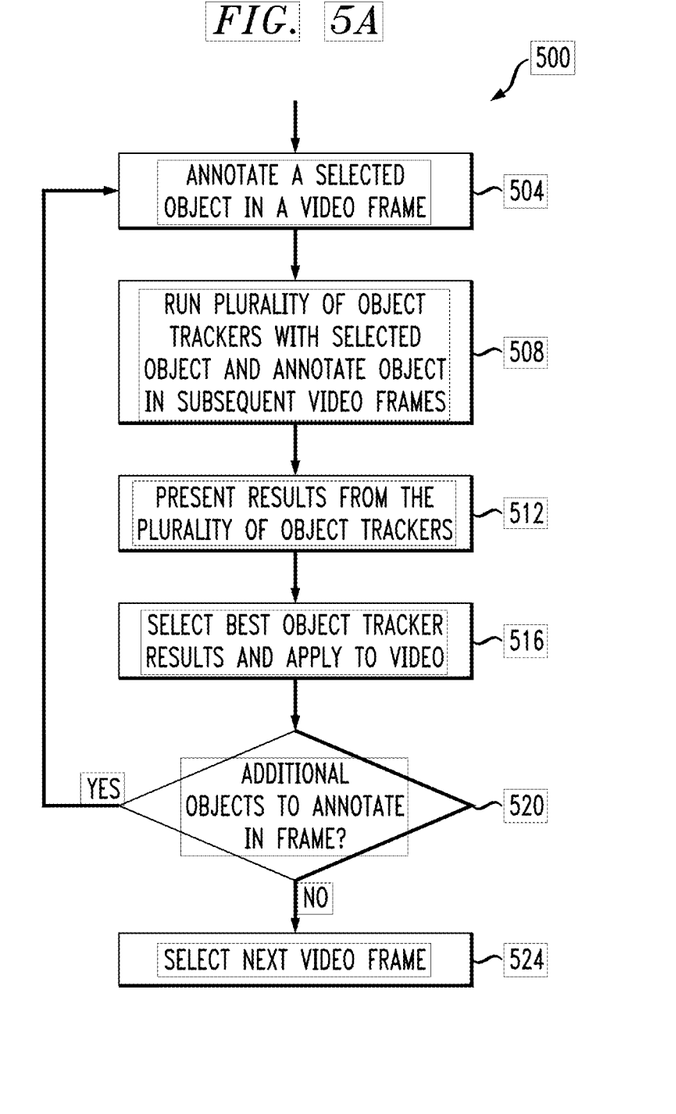
FIG. 5 is an illustration of an example workflow for annotating a video, in accordance with an example embodiment.
Figure 5B:
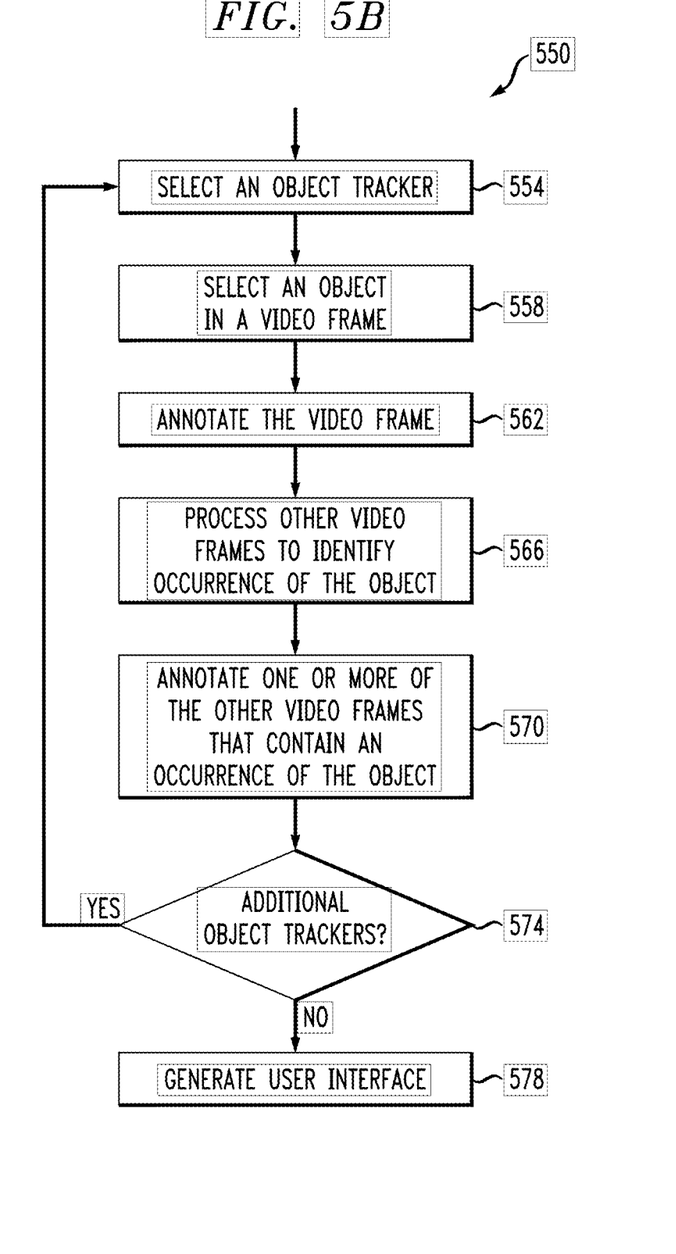

FIG. 5 is an illustration of an example workflow 500 for annotating a video, in accordance with an example embodiment. In one example embodiment, an object in a video frame is annotated (operation 504). For example, the object may be manually annotated by a user. The system 300 performs object tracking on the annotated object using several different tracking algorithms and the object is automatically labeled in subsequent frames (operation 508). In one example embodiment, one or more of the object trackers are run simultaneously. The tracking results are presented simultaneously on the same user interface (operation 512). The user then selects a preferred object tracker and the selected object tracker is applied to the given video (operation 516). A check is then performed to determine if there are additional objects in the frame to annotate (operation 520). If there are additional objects to annotate in the current frame, the workflow 500 proceeds with operation 504; otherwise, the next frame in the video is selected for processing (operation 524).

Given the discussion thus far, it will be appreciated that, in general terms, an exemplary method, according to an aspect of the invention, includes the operations of obtaining an annotation of an object in a video frame 504; running a plurality of computerized object trackers on the annotated object to automatically label the annotated object in a plurality of subsequent video frames 508; presenting a computerized user interface aggregating results of the automatic labeling by the plurality of computerized object trackers 512; obtaining, based on the computerized user interface, an identification of a best one of the plurality of computerized object trackers 516; and using the selected computerized object tracker to annotate the object in the plurality of subsequent video frames 516.

Note that there is not necessarily any tool that is best under all circumstances—they perform differently in different situations. One or more embodiments provide to the human the ability to easily choose the best option in the current situation. The effort in choosing the best option is significantly less than manually annotating many of the objects, thereby improving the technological process of video annotation.

In one example embodiment, a non-transitory computer readable medium comprises computer executable instructions which when executed by a computer cause the computer to perform operations comprising: obtaining an annotation of an object in a video frame 504; running a plurality of computerized object trackers on the annotated object to automatically label the annotated object in a plurality of subsequent video frames 508; presenting a computerized user interface aggregating results of the automatic labeling by the plurality of computerized object trackers 512; obtaining, based on the computerized user interface, an identification of a best one of the plurality of computerized object trackers 516; and using the selected computerized object tracker to annotate the object in the plurality of subsequent video frames 516.

Figure 6:
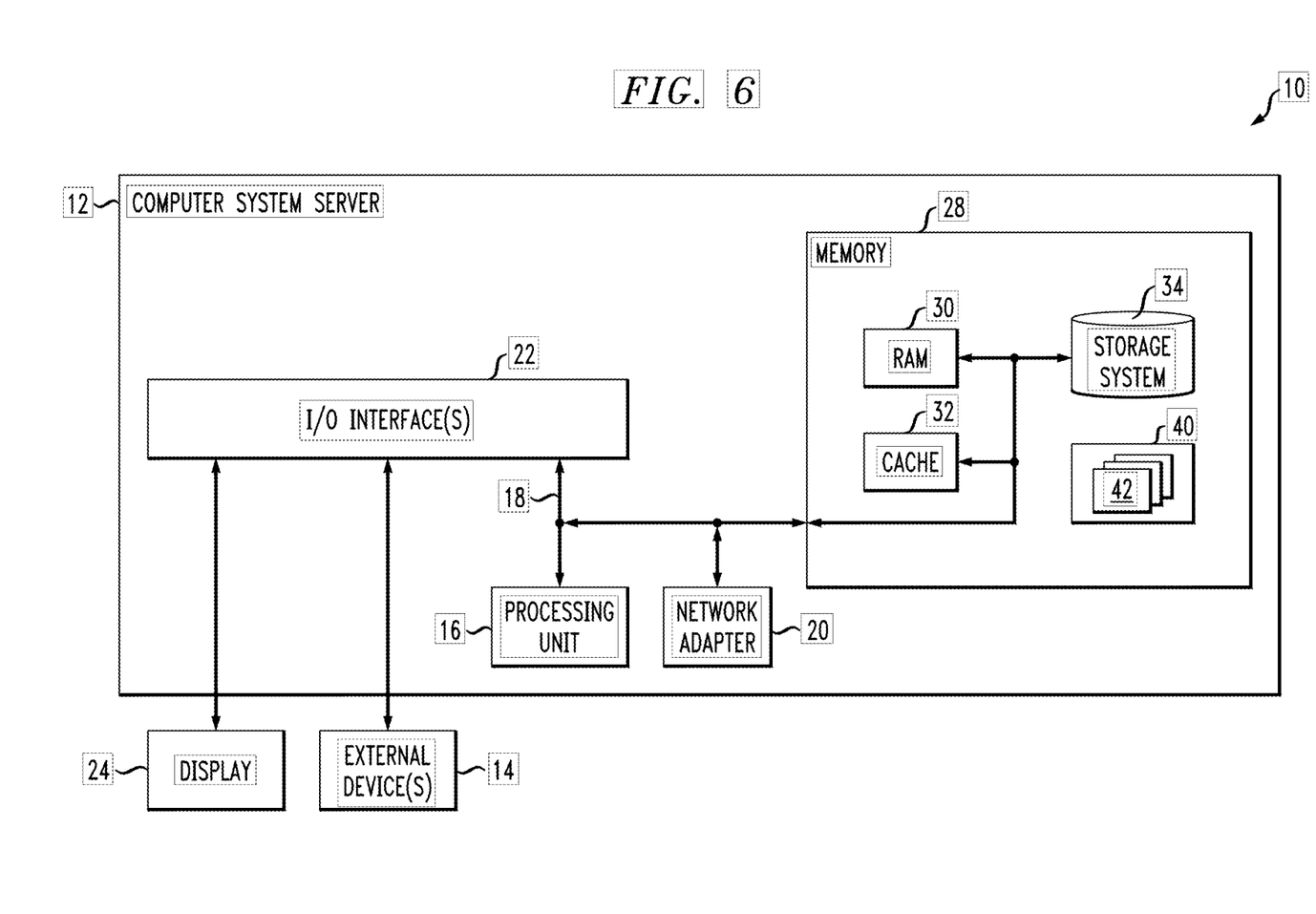
FIG. 6 depicts a computer system that may be useful in implementing one or more aspects and/or elements of the invention, also representative of a cloud computing node according to an embodiment of the present invention.

In one example embodiment, an apparatus comprises a memory 28; and at least one processor 16, coupled to the memory, and operative to perform operations comprising: obtaining an annotation of an object in a video frame 504; running a plurality of computerized object trackers on the annotated object to automatically label the annotated object in a plurality of subsequent video frames 508; presenting a computerized user interface aggregating results of the automatic labeling by the plurality of computerized object trackers 512; obtaining, based on the computerized user interface, an identification of a best one of the plurality of computerized object trackers 516; and using the selected computerized object tracker to annotate the object in the plurality of subsequent video frames 516.

In one example embodiment, the steps of obtaining the annotation, running the plurality of computerized trackers, presenting the computerized user interface, obtaining the identification, and using the selected computerized object tracker, for a plurality of additional objects in the video frame which have not yet been annotated, are repeated 520. In one example embodiment, the operations further comprise generating the user interface utilizing the aggregated results 578. In one example embodiment, in the step of using the selected computerized object tracker, the annotation of a subsequent occurrence of the object is performed by copying a label from an earlier video frame at the location identified by the selected computerized object tracker 516. In one example embodiment, the plurality of computerized trackers employ two or more different values of learning rate, alpha, concurrently.

In one example embodiment, a method of at least one of the plurality of computerized trackers comprises one of Crypto-Stego-Real-Time and kernelized correlation filters. In one example embodiment, the obtaining the annotation and obtaining the identification comprise obtaining, by a computer implementing the plurality of computerized object trackers and the computerized user interface, from a human user 516. In one example embodiment, the user interface presents a frame-by-frame comparison of results of the plurality of computerized object trackers, including at least one frame prior to a first tracked frame, and at least one frame subsequent to a last tracked frame 400.

One or more embodiments of the invention, or elements thereof, can be implemented in the form of an apparatus including a memory and at least one processor that is coupled to the memory and operative to perform exemplary method steps. FIG. 6 depicts a computer system that may be useful in implementing one or more aspects and/or elements of the invention, also representative of a cloud computing node according to an embodiment of the present invention. Referring now to FIG. 6, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described with respect to FIG. 3. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining an annotation of an object in a video frame, the annotation comprising a first label for the object;
   running a plurality of computerized object trackers on the annotated object to automatically label the annotated object in each of a plurality of subsequent video frames based on the first label;
   presenting a computerized user interface displaying results of the automatic labeling performed by each of the plurality of computerized object trackers;
   obtaining, based on the computerized user interface, an identification of a best one of the plurality of computerized object trackers; and
   using the selected computerized object tracker to annotate the object in the plurality of subsequent video frames.

2. The method of claim 1, further comprising repeating the steps of obtaining the annotation, running the plurality of computerized trackers, presenting the computerized user interface, obtaining the identification, and using the selected computerized object tracker, for a plurality of additional objects in the video frame which have not yet been annotated.

3. The method of claim 2, further comprising generating the user interface utilizing the results of the automatic labeling performed by each of the plurality of computerized object trackers.

4. The method of claim 1, wherein, in the step of using the selected computerized object tracker, the annotation of a subsequent occurrence of the object is performed by copying a label from an earlier video frame at the location identified by the selected computerized object tracker.

5. The method of claim 1, wherein the plurality of computerized trackers employ two or more different values of learning rate, alpha, concurrently.

6. The method of claim 1, wherein a method of at least one of the plurality of computerized trackers comprises one of Crypto-Stego-Real-Time and kernelized correlation filters.

7. The method of claim 1, wherein the obtaining the annotation and obtaining the identification comprise obtaining, by a computer implementing the plurality of computerized object trackers and the computerized user interface, from a human user.

8. The method of claim 1, wherein the user interface presents a frame-by-frame comparison of results of the plurality of computerized object trackers, including at least one frame prior to a first tracked frame, and at least one frame subsequent to a last tracked frame.

9. A non-transitory computer readable medium comprising computer executable instructions which when executed by a computer cause the computer to perform operations comprising:
   obtaining an annotation of an object in a video frame, the annotation comprising a first label for the object;
   running a plurality of computerized object trackers on the annotated object to automatically label the annotated object in each of a plurality of subsequent video frames based on the first label;
   presenting a computerized user interface displaying results of the automatic labeling performed by each of the plurality of computerized object trackers;
   obtaining, based on the computerized user interface, an identification of a best one of the plurality of computerized object trackers; and
   using the selected computerized object tracker to annotate the object in the plurality of subsequent video frames.

10. The non-transitory computer readable medium of claim 9, the operations further comprising repeating the steps of obtaining the annotation, running the plurality of computerized trackers, presenting the computerized user interface, obtaining the identification, and using the selected computerized object tracker, for a plurality of additional objects in the video frame which have not yet been annotated.

11. The non-transitory computer readable medium of claim 10, the operations further comprising generating the user interface utilizing the results of the automatic labeling performed by each of the plurality of computerized object trackers.

12. The non-transitory computer readable medium of claim 9, wherein, in the step of using the selected computerized object tracker, the annotation of a subsequent occurrence of the object is performed by copying a label from an earlier video frame at the location identified by the selected computerized object tracker.

13. An apparatus comprising:
   a memory; and
   at least one processor, coupled to the memory, and operative to perform operations comprising:
   obtaining an annotation of an object in a video frame, the annotation comprising a first label for the object;
   running a plurality of computerized object trackers on the annotated object to automatically label the annotated object in each of a plurality of subsequent video frames based on the first label;
   presenting a computerized user interface displaying results of the automatic labeling performed by each of the plurality of computerized object trackers;
   obtaining, based on the computerized user interface, an identification of a best one of the plurality of computerized object trackers; and
   using the selected computerized object tracker to annotate the object in the plurality of subsequent video frames.

14. The apparatus of claim 13, the operations further comprising repeating the steps of obtaining the annotation, running the plurality of computerized trackers, presenting the computerized user interface, obtaining the identification, and using the selected computerized object tracker, for a plurality of additional objects in the video frame which have not yet been annotated.

15. The apparatus of claim 14, the operations further comprising generating the user interface utilizing the results of the automatic labeling performed by each of the plurality of computerized object trackers.

16. The apparatus of claim 13, wherein, in the step of using the selected computerized object tracker, the annotation of a subsequent occurrence of the object is performed by copying a label from an earlier video frame at the location identified by the selected computerized object tracker.

17. The apparatus of claim 13, wherein the plurality of computerized trackers employ two or more different values of learning rate, alpha, concurrently.

18. The apparatus of claim 13, wherein a method of at least one of the plurality of computerized trackers comprises one of Crypto-Stego-Real-Time and kernelized correlation filters.

19. The apparatus of claim 13, wherein the obtaining the annotation and obtaining the identification comprise obtaining, by a computer implementing the plurality of computerized object trackers and the computerized user interface, from a human user.

20. The apparatus of claim 13, wherein the user interface presents a frame-by-frame comparison of results of the plurality of computerized object trackers, including at least one frame prior to a first tracked frame, and at least one frame subsequent to a last tracked frame.

\* \* \* \* \*